(12) United States Patent
Zarfos et al.

(10) Patent No.: US 9,440,414 B2
(45) Date of Patent: Sep. 13, 2016

(54) FABRIC JACKETED UNIDIRECTIONAL NOODLE

(71) Applicant: The Boeing Company, Chicago, IL (US)

(72) Inventors: Joshua Zarfos, Renton, WA (US); Vladislav Andryukov, Kent, WA (US); Darrell Campbell, Vashon Island, WA (US)

(73) Assignee: The Boeing Company, Chicago, IL (US)

( * ) Notice: Subject to any disclaimer, the term of this patent is extended or adjusted under 35 U.S.C. 154(b) by 97 days.

(21) Appl. No.: 14/340,982

(22) Filed: Jul. 25, 2014

(65) Prior Publication Data
US 2016/0023431 A1    Jan. 28, 2016

(51) Int. Cl.
| B32B 5/26 | (2006.01) |
| B32B 37/18 | (2006.01) |
| B32B 37/00 | (2006.01) |
| B32B 5/12 | (2006.01) |
| B29D 99/00 | (2010.01) |

(52) U.S. Cl.
CPC ............ *B32B 5/26* (2013.01); *B29D 99/0003* (2013.01); *B29D 99/0014* (2013.01); *B32B 5/12* (2013.01); *B32B 37/0076* (2013.01); *B32B 37/18* (2013.01); *B32B 2305/076* (2013.01); *B32B 2605/18* (2013.01)

(58) Field of Classification Search
CPC ........................................................ B32B 5/26
USPC ........................................................ 428/113
See application file for complete search history.

(56) References Cited

U.S. PATENT DOCUMENTS

| 4,331,723 A * | 5/1982 | Hamm ................. B29C 70/865 |
| | | 156/293 |
| 5,650,229 A | 7/1997 | Gross et al. |
| 6,562,436 B2 | 5/2003 | George et al. |

FOREIGN PATENT DOCUMENTS

| EP | 2666622 | 11/2013 | |
| EP | 2727711 | 5/2014 | |
| WO | WO0162495 | 8/2001 | |
| WO | WO 0162495 A3 * | 2/2002 | ............... B32B 5/12 |
| WO | WO2009/140555 | 11/2009 | |

OTHER PUBLICATIONS

European search report issued Dec. 22, 2015 in co-pending EP Patent Application No. 1565617.0

* cited by examiner

*Primary Examiner* — Brent O'Hern
(74) *Attorney, Agent, or Firm* — Joseph M. Rolnicki; Evans & Dixon, L.L.C.

(57) ABSTRACT

A composite, radius filler noodle for a co-cured spar or stringer used in aircraft construction has a unidirectional composite core and pluralities of pre-preg fabric strips stacked in layers surrounding the core.

20 Claims, 11 Drawing Sheets

FABRIC JACKETED UNIDIRECTIONAL NOODLE

FIELD

This disclosure pertains to a composite, radius filler noodle for a co-cured spar or stringer used in aircraft construction.

BACKGROUND

In typical constructions of composite spars or stringers for aircraft, two "c" shaped composite channels are brought together back-to-back to form the central web and top and bottom flanges of the spar. The two channels are each constructed of a plurality of fiber-reinforced polymer plies that have been pre-impregnated with a resin, or pre-preg plies. When the two "c" shaped channels are brought together, the radiuses of the channels where the central web transitions into the flanges forms a small v-shaped gap along the centers of the top and bottom flanges. A composite radius filler, commonly called a "noodle" is typically employed to fill these gaps.

Noodles have been constructed from unidirectional pre-preg tape. Noodles have also been constructed of pre-preg fabric. However constructed, the noodles are positioned in the gaps in the top and bottom flanges of the composite spar and are co-cured with the channels of the spar.

During curing, temperatures typically reach 350 degrees Fahrenheit. The heating of the spar and subsequent cooling to ambient temperature can cause cracking in the noodle. The noodle in the final spar construction can also crack due to mechanical and/or thermal stresses exerted on the spar in use in an aircraft. Cracks in the noodle weaken the entire spar. It is therefore desirable to improve the overall strength of the composite spar by preventing or reducing the propagation of cracks through the noodles employed in constructing the spar.

SUMMARY

This disclosure pertains to a composite radius filler noodle and its method of construction that prevents the propagation of cracks through the noodle. The noodle is basically constructed from composite unidirectional pre-preg tape and composite pre-preg fabric strips. The tape and strips are brought together according to the method of this disclosure to construct a noodle where, should cracks form in the core of the noodle, the cracks are prevented from propagating to the exterior surface of the noodle and the rest of the spar structure.

The noodle core has a triangular cross-section configuration and a length that is determined to fill the length of a gap on the spar with which the noodle is to be used. The triangular configuration of the core gives the core first, second and third exterior surfaces that extend along the length of the core. The core is constructed of unidirectional pre-preg tape that extends along the core length. According to the method of making the noodle, the unidirectional pre-preg tape could be pultruded or otherwise die-formed into the triangular cross-section configuration of the core.

A first pre-preg fabric strip covers the core first surface. The first strip has a length that extends completely along the length of the core first surface and a width that extends completely across the core first surface.

A second pre-preg fabric strip covers the core second surface. The second strip has a length that extends completely along the length of the core second surface and a width that extends completely across the core second surface.

A third pre-preg fabric strip covers the core third surface. The third strip has a length that extends completely along the length of the core third surface and a width that extends completely across the core third surface.

A fourth pre-preg fabric strip covers the first strip on the core first surface. The fourth strip has a length that extends completely across the length of the first strip. In one embodiment the fourth strip has a width that is larger than the width of the first strip. In another embodiment the width of the fourth strip is smaller than the width of the first strip.

A fifth strip of pre-preg fabric covers the second strip on the core second surface. The fifth strip has a length that extends completely along the length of the second strip. In one embodiment, the fifth strip has a width that is larger than the width of the second strip. In another embodiment the fifth strip has a width that is smaller than the width of the second strip.

A sixth strip of pre-preg fabric covers the third strip on the core third surface. The sixth strip of fabric has a length that extends completely along the length of the third strip. In one embodiment, the sixth strip has a width that is larger than the width of the third strip. In another embodiment the sixth strip has a width that is smaller than the width of the third strip.

A seventh pre-preg fabric strip covers the fourth strip and the first strip. The seventh strip has a length that extends completely along the length of the fourth strip. In one embodiment, the seventh strip has a width that extends completely across the fourth strip. In another embodiment the seventh strip has a width that is smaller than the width of the fourth strip.

An eighth pre-preg fabric strip covers the fifth strip and the second strip. The eighth strip has a length that extends completely along the length of the fifth strip. In one embodiment, the eight strip has a width that extends completely across the width of the fifth strip. In another embodiment the eighth strip has a width that is smaller than the width of the fifth strip.

A ninth pre-preg fabric strip covers the sixth strip and the third strip. The ninth strip has a length that extends completely along the length of the sixth strip. In one embodiment, the ninth strip has a width that extends completely across the width of the sixth strip. In another embodiment the ninth strip has a width that is smaller than the width of the sixth strip.

In the construction of the noodle described above, the multiple plies of fabric strips on the exterior surface of the noodle core enable the noodle core to be reduced in size, thereby likely reducing the chance of thermally induced matrix cracks forming in the core. The fabric jacket produced by the multiple plies of fabric strips on the exterior surfaces of the core provides a higher fracture toughness material to the core exterior and an arduous crack path to the noodle exterior for the purpose of preventing cracks from propagating out of the noodle core. All of this is accomplished without affecting the configuration of the noodle exterior. The noodle unidirectional core can be produced at a high rate with existing pultrusion machines, and the fabric strips on the core exterior surfaces can be installed on the spar or stringer charges at the same time the unidirectional core is installed. The number and orientation of the fabric strips can be adjusted to achieve a desired level of mechanical strength. Changing the number of fabric strips on the exterior surfaces of the core also enables adjusting the size of the core, which is desirable for achieving an ideally smaller core for the sake of preventing cracks, while maintaining a large enough core to be produced at high rates by pultrusion. The multiple plies of fabric strips can be assembled on the exterior surfaces of the core, or could be assembled on a flat tool in a flat configuration of the strips prior to their being assembled to a surface of the core.

The features, functions, and advantages that have been discussed can be achieved independently in various embodiments or may be combined in other embodiments, further details of which can be seen with reference to the following description and drawings.

BRIEF DESCRIPTION OF THE DRAWINGS

Further features of the subject matter of this disclosure are set forth in the following description and drawing figures.

DETAILED DESCRIPTION

Figure 1:
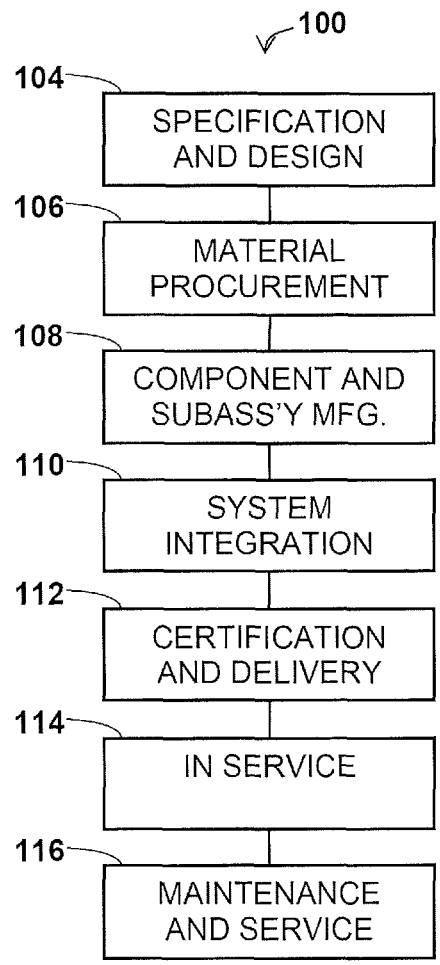
FIG. 1 is a flow diagram of aircraft production and service methodology.
Figure 2:
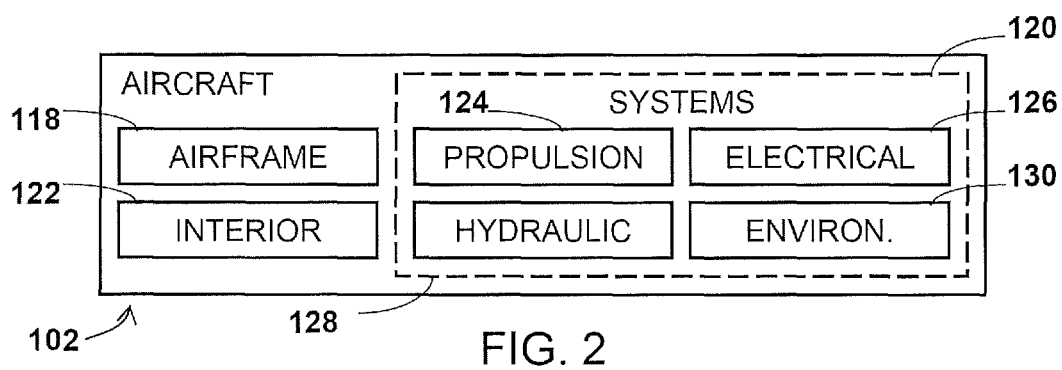
FIG. 2 is a block diagram of an aircraft.

Referring more particularly to the drawings, embodiments of the disclosure may be described in the context of an aircraft manufacturing and service method 10 as shown in FIG. 1 and an aircraft 12 as shown in FIG. 2. During pre-production, exemplary method 10 may include specification and design 14 of the aircraft 12 and material procurement 16. During production, component and subassembly manufacturing 18 and system integration 20 of the aircraft 12 takes place. Thereafter, the aircraft 12 may go through certification and delivery 22 in order to be placed in service 24. While in service by a customer, the aircraft 12 is scheduled for routine maintenance and service 26 (which may also include modification, reconfiguration, refurbishment, and so on).

Each of the processes of method 10 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 12 produced by exemplary method 10 may include an airframe 28 with a plurality of systems 30 and an interior 32. Examples of high-level systems 30 include one or more of a propulsion system 34, an electrical system 36, a hydraulic system 36, and an environmental system 38. Any number of other systems may be included. Although an aerospace example is shown, the principles of the invention may be applied to other industries, such as the automotive industry.

Apparatus and methods embodied herein may be employed during any one or more of the stages of the production and service method 10. For example, components or subassemblies corresponding to production process 18 may be fabricated or manufactured in a manner similar to components or subassemblies produced while the aircraft 12 is in service. Also, one or more apparatus embodiments, method embodiments, or a combination thereof may be utilized during the production stages 18 and 20, for example, by substantially expediting assembly of or reducing the cost of an aircraft 12. Similarly, one or more of apparatus embodiments, method embodiments, or a combination thereof may be utilized while the aircraft 12 is in service, for example and without limitation, to maintenance and service 26.

Figure 3:
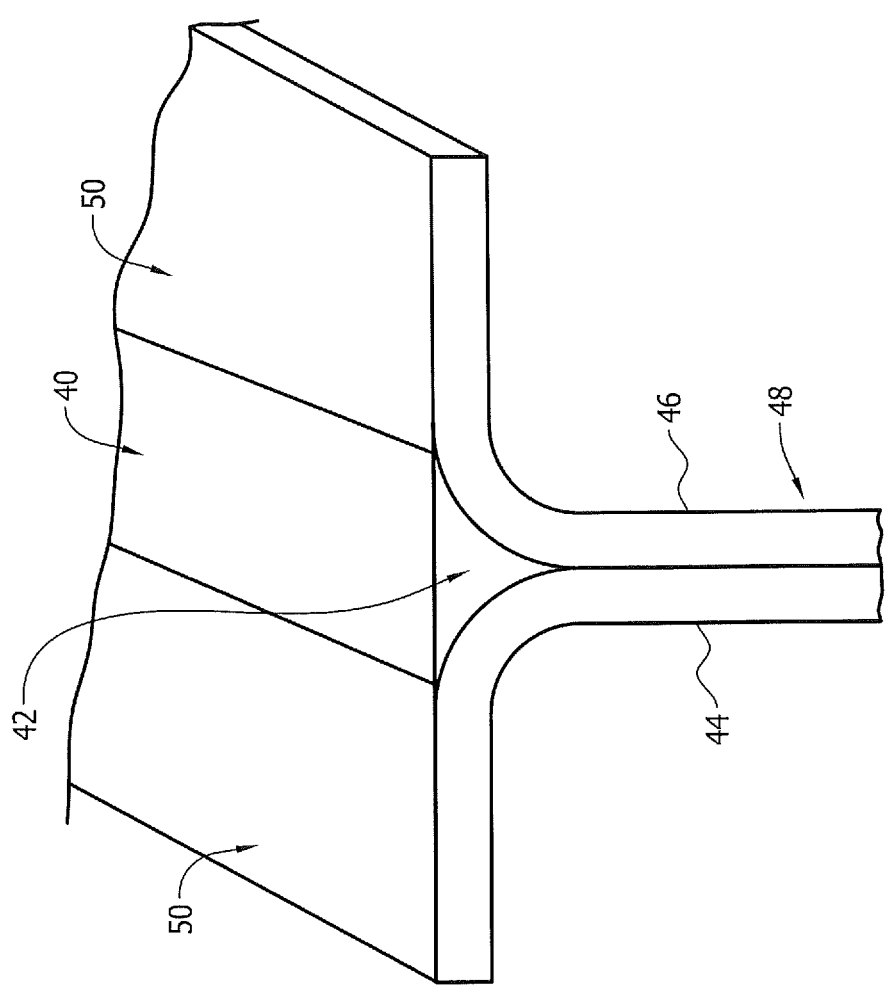
FIG. 3 is a representation of a partial perspective view of the composite radius filler noodle of this disclosure installed in a v-shape gap formed by two back-to-back "c" shaped composite channels.

FIG. 3 is a representation of a partial perspective view of the composite radius filler noodle 40 of this disclosure installed in a v-shaped gap 42 formed by two back-to-back c-shaped composite channels 44, 46. Only upper portions of the c-shaped channels 44, 46 are represented in FIG. 3. The c-shaped channels 44, 46 are used in the typical construction of composite spars or stringers for aircraft. The two channels 44, 46 are each constructed of a plurality of pre-preg plies.

The two channels 14, 16 are brought together back-to-back to form the central web 48 of the spar and the top 50 and bottom flanges of the spar, with only the top flange being shown in FIG. 3. As represented in FIG. 3, the noodle 40 of this disclosure is constructed to fill the v-shaped gap 42 formed in the top and bottom flanges of the spar.

Figure 4:
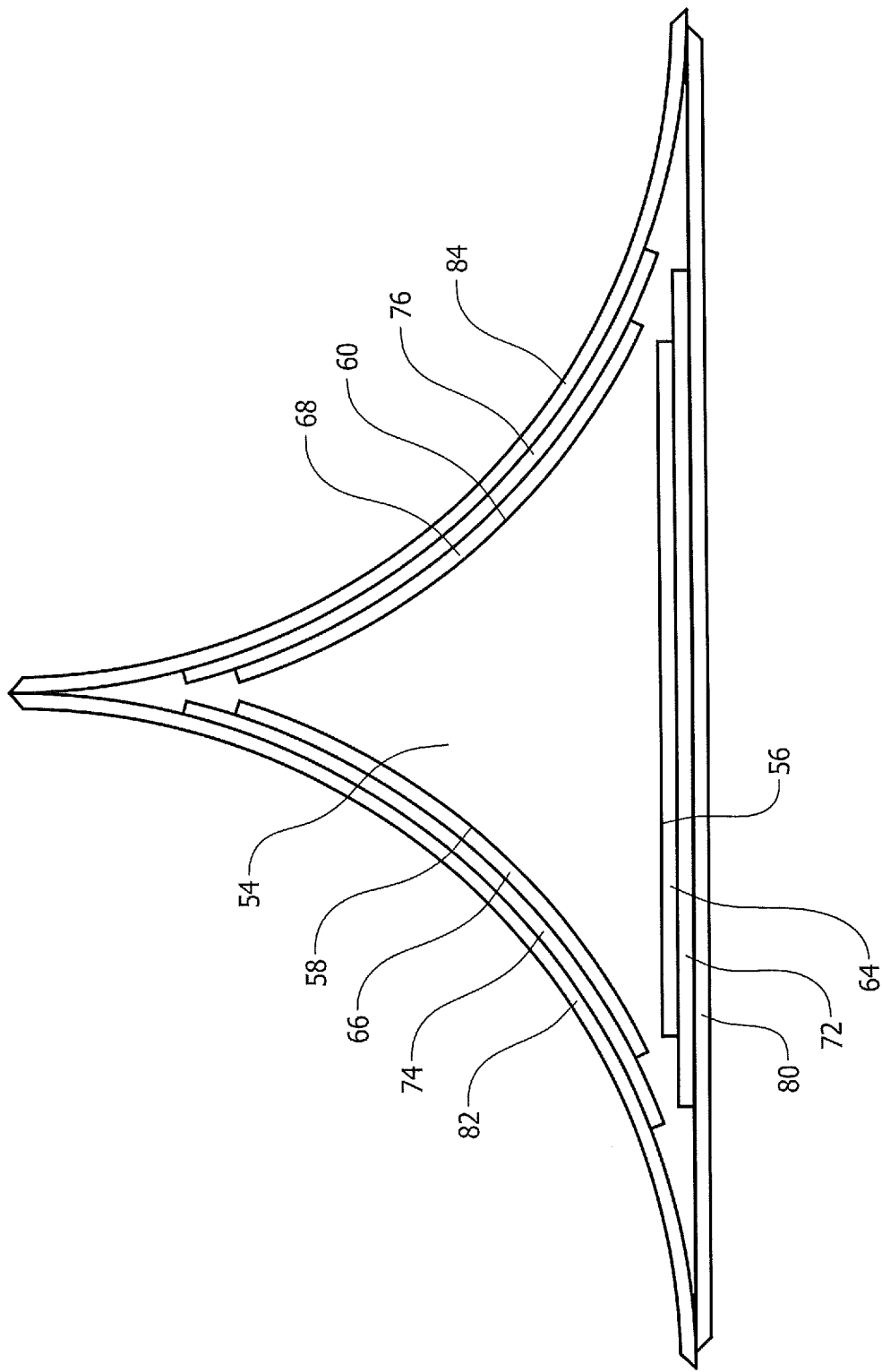
FIG. 4 is a representation of an end elevation view of the noodle that has been constructed according to one method of construction.

Referring to FIG. 4, an end view of the noodle 40 is represented showing details of its construction. The noodle 40 is shown rotated 180° from its orientation represented in FIG. 3. The noodle is basically constructed from composite unidirectional pre-preg tape and composite pre-preg fabric strips. The tape and strips are brought together according to the method of this disclosure to construct the noodle 40 where, should cracks form in the core of the noodle the cracks are prevented from propagating to the exterior surface of the noodle.

The noodle 40 is constructed with a core 54 having a triangular cross section configuration. The core 54 has a length that is determined to fill the length of the v-shape gap on the spar with which the noodle is to be used. The triangular configuration of the core 54 gives the core first 56, second 58 and third 60 exterior surfaces. Each of these exterior surfaces extends for the length of the core 54. The core first surface 56 is flat. This surface will extend across the top of the gap 42 formed at the center of the spar flange 50. The second 58 and third 60 surfaces are curved. These surfaces will match the curvature of the radiuses formed at the bottom of the v-shaped gap 12. The core 54 is constructed of unidirectional pre-preg tape that extends along the length of the core. The core 54 fills up the entire region within the layers of strips to be described with the core 54 extending all the way into the apices between the strips of the triangular noodle. No other materials are used in constructing the core 24. According to a method of making the noodle 10, the unidirectional pre-preg tape could be pultruded or otherwise die-formed into the triangular cross section configuration of the core shown.

A first pre-preg fabric strip 64 covers the core first surface 56. The first strip 64 has a length that extends completely along the length of the core first surface 56 and a width that extends completely across the core first surface 56. In the example of the noodle 40 represented in the drawing figures, the width of the first strip 64 is approximately 0.738 inches.

A second pre-preg fabric strip 66 covers the core second surface 58. The second strip 66 has a length that extends completely along the length of the core second surface 58 and a width that extends completely across the core second surface 58. In the example of the noodle 40 represented in the drawing figures, the width of the second strip 66 is approximately 0.593 inches.

A third pre-preg fabric strip 68 covers the core third surface 60. The third strip 68 has a length that extends completely along the length of the core third surface 60 and a width that extends completely across the core third surface 60. In the example of the noodle 40 represented in the drawing figures, the width of the third strip 68 is substantially the same as the width of the second strip 66, 0.593 inches. Thus, the width of the pre-preg fabric second strip, which is 0.593 inches, and the width of the pre-preg fabric third strip, which is 0.593 inches are the same and are smaller than the width of the pre-preg fabric first strip, which is 0.738 inches.

Figure 8:
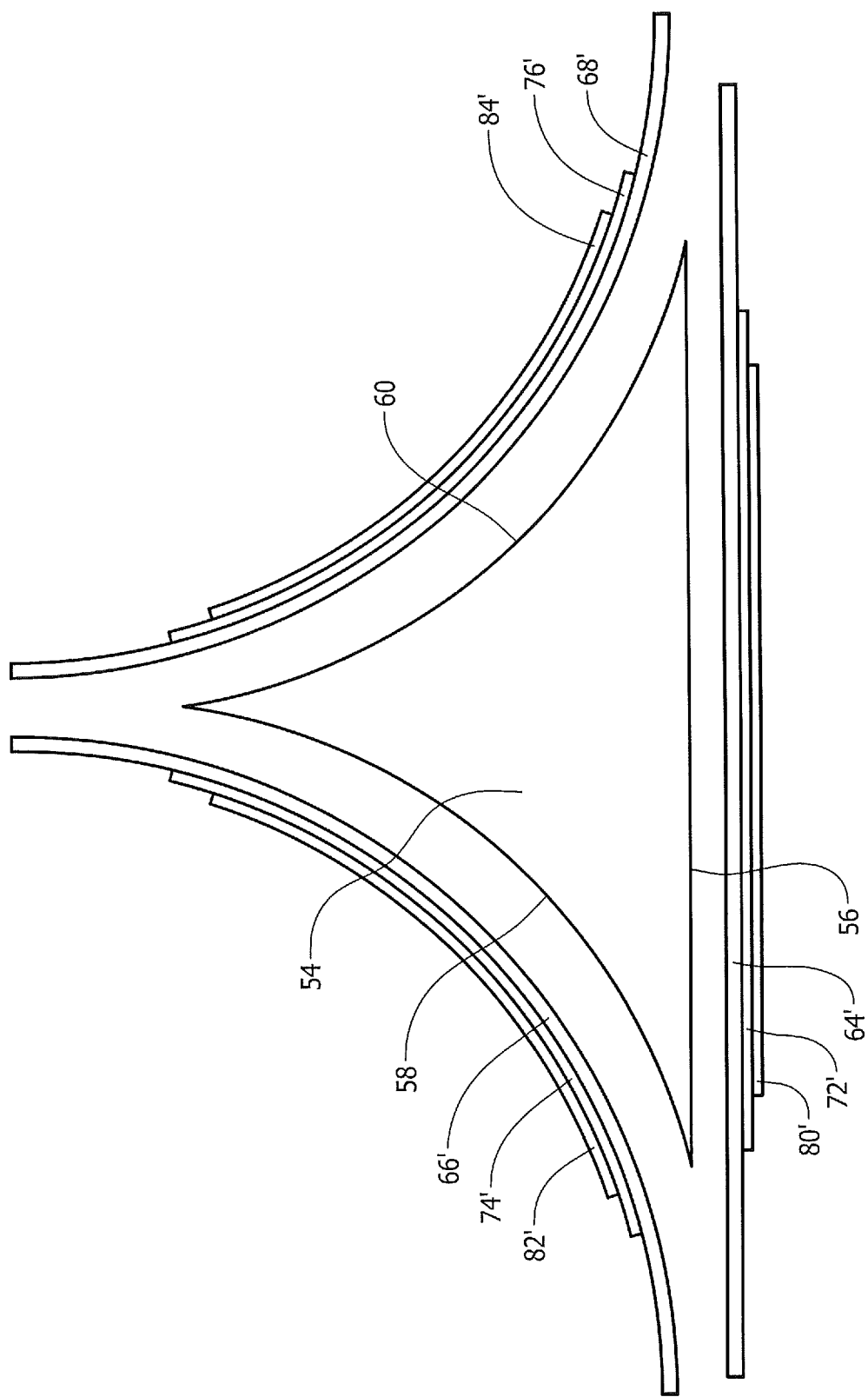
FIG. 8 is a representation of a variant embodiment of constructing the noodle.
Figure 9:
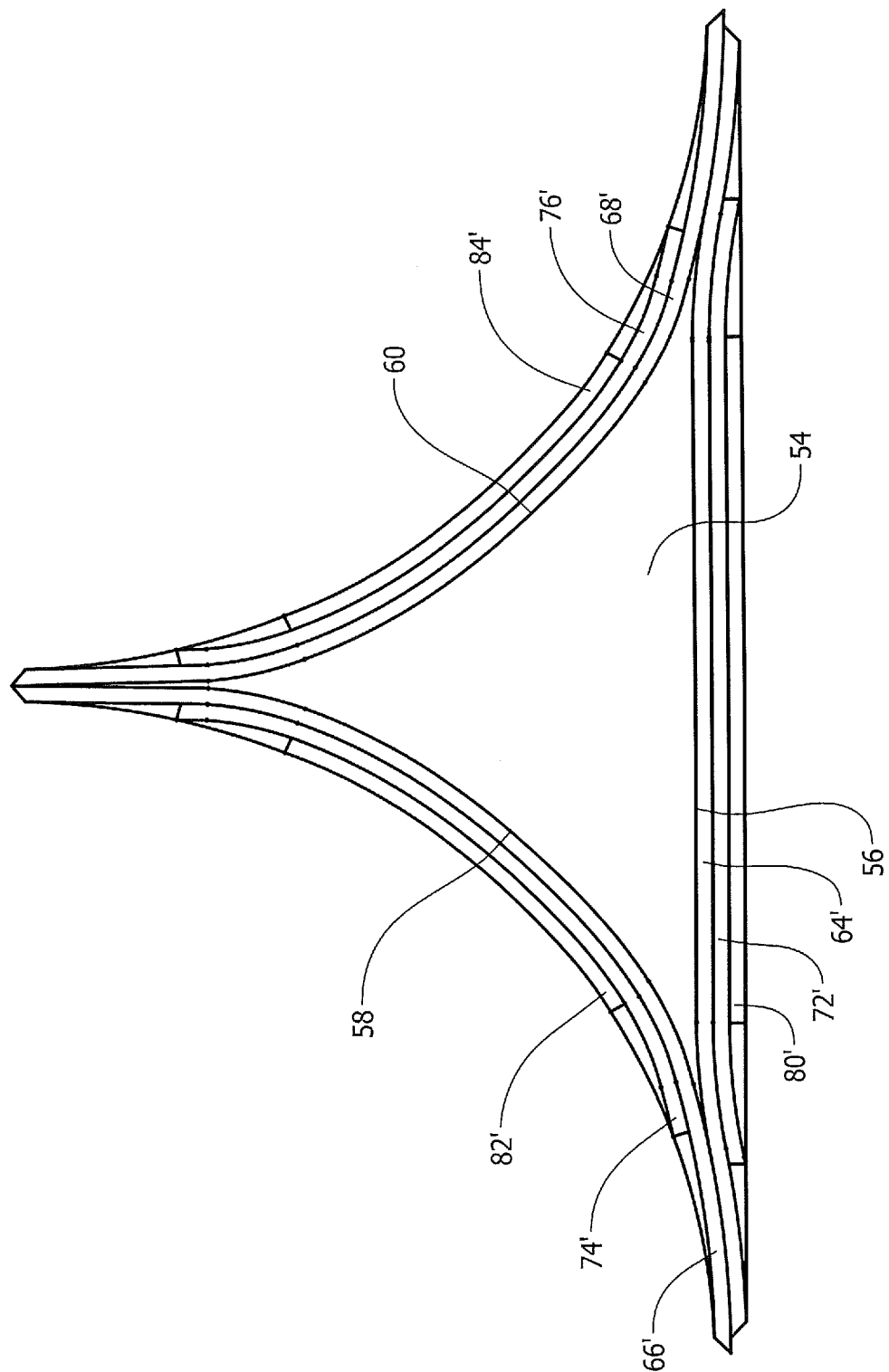
FIG. 9 is a representation of an end view of a variant embodiment of the noodle constructed according to the method of FIG. 8.
Figure 10:
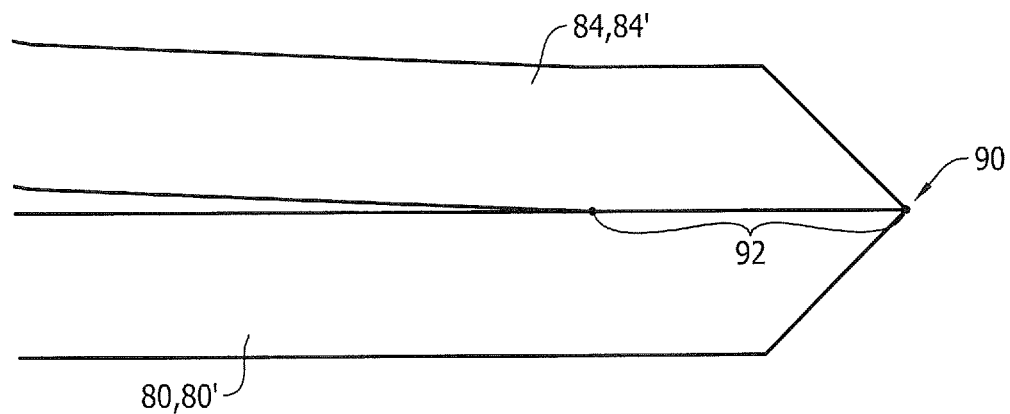
FIG. 10 is a representation of an interaction between a pair of pre-preg fabric strips meeting along an apex edge of the noodle.
Figure 11:
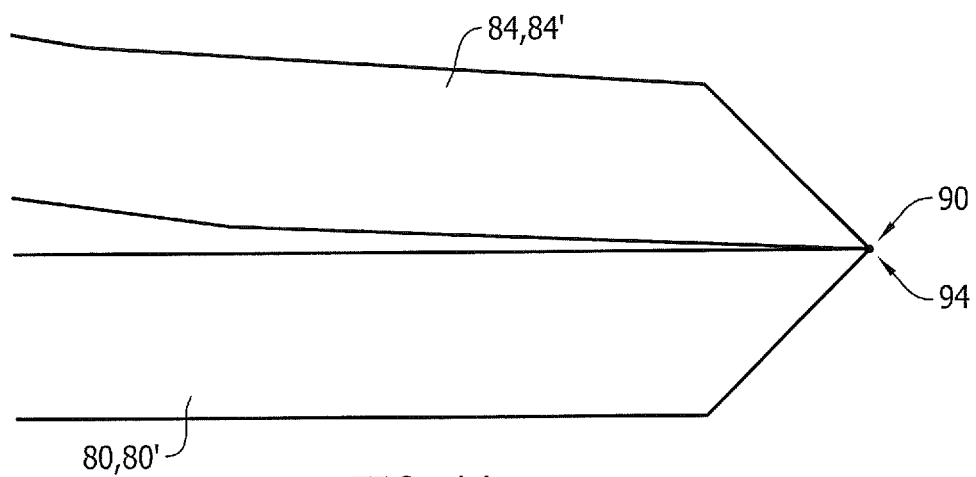
FIG. 11 is a representation of an interaction between a pair of pre-preg fabric strips meeting along an apex edge of the noodle.
Figure 12:
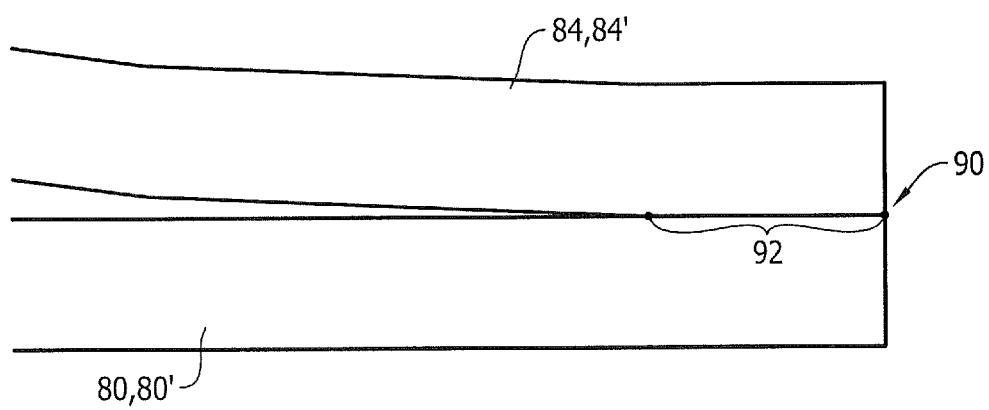
FIG. 12 is a representation of an interaction between a pair of pre-preg fabric strips meeting along an apex edge of the noodle.
Figure 13:
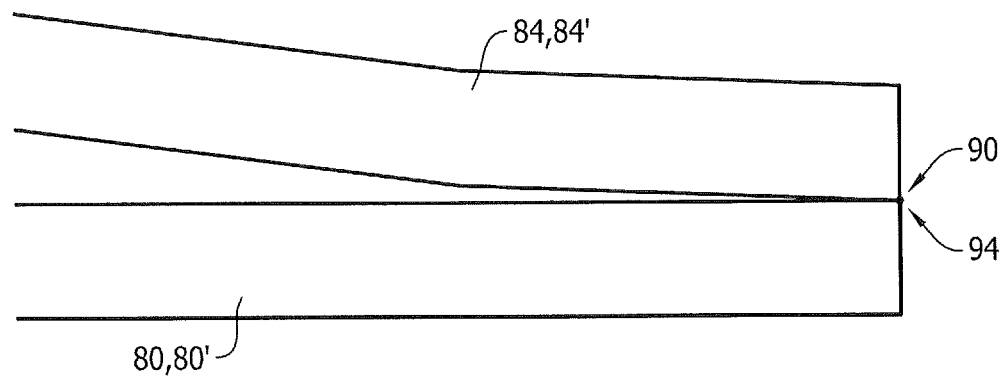
FIG. 13 is a representation of an interaction between a pair of pre-preg fabric strips meeting along an apex edge of the noodle.
Figure 14:
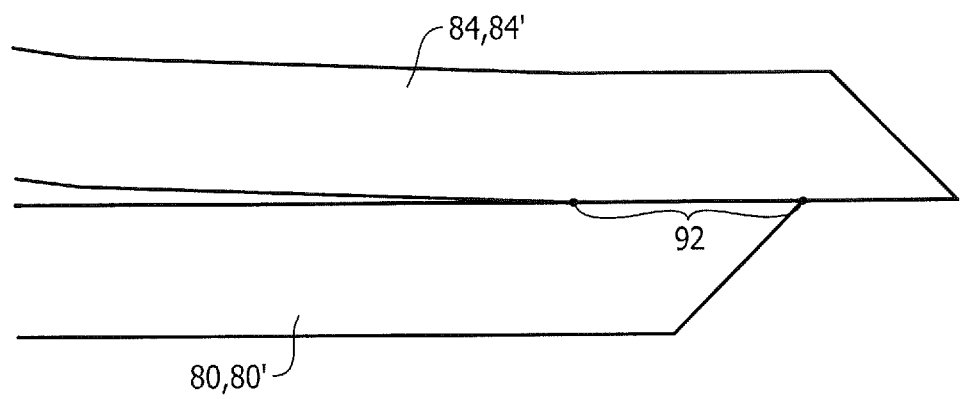
FIG. 14 is a representation of an interaction between a pair of pre-preg fabric strips meeting along an apex edge of the noodle.
Figure 15:
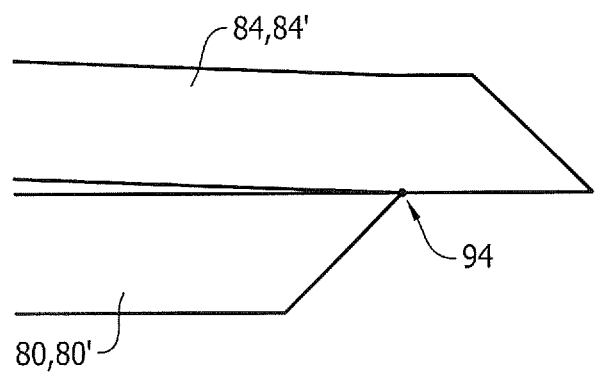
FIG. 15 is a representation of the interaction between a pair of pre-preg fabric strips meeting along an apex edge of the noodle.
Figure 16:
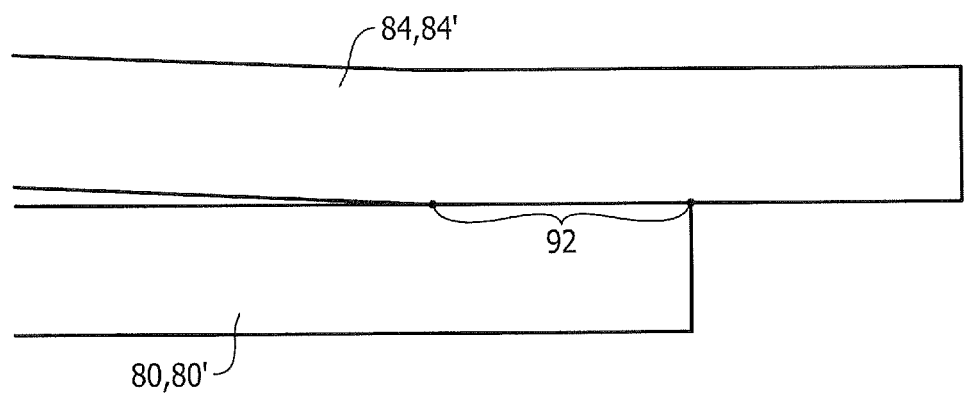
FIG. 16 is a representation of the interaction between a pair of pre-preg fabric strips meeting along an apex edge of the noodle.
Figure 17:
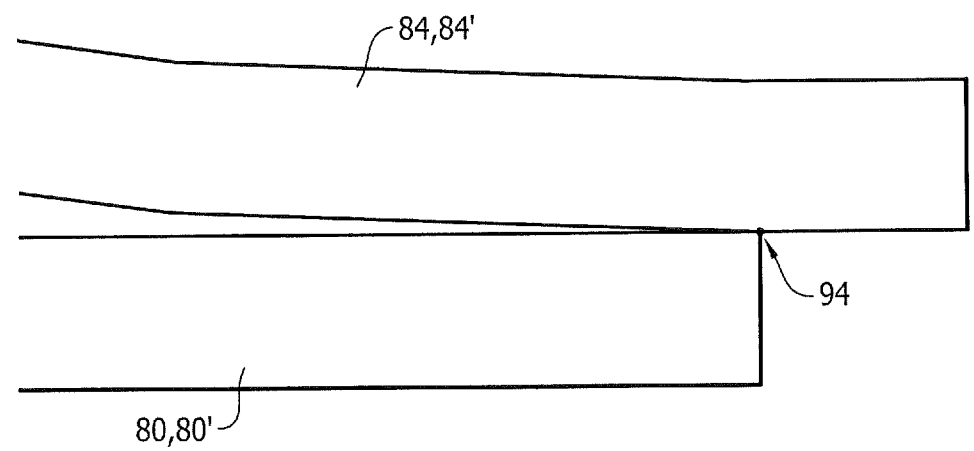
FIG. 17 is a representation of the interaction between a pair of pre-preg fabric strips meeting along an apex edge of the noodle.
Figure 18:
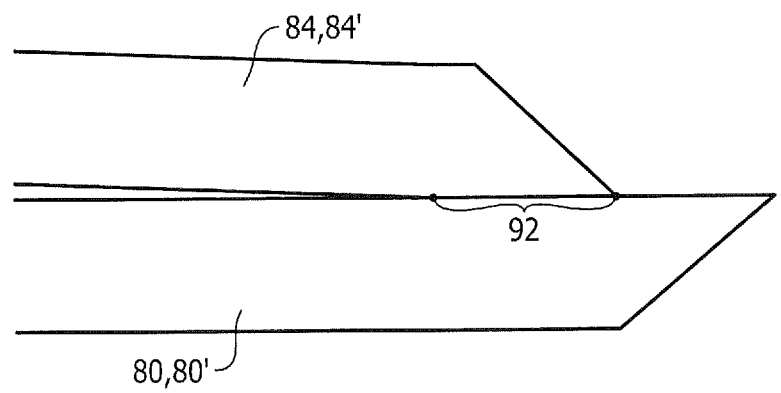
FIG. 18 is a representation of the interaction between a pair of pre-preg fabric strips meeting along an apex edge of the noodle.
Figure 19:
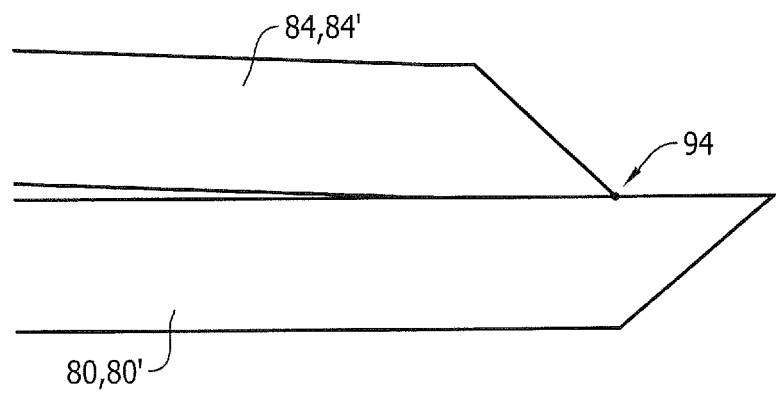
FIG. 19 is a representation of the interaction between a pair of pre-preg fabric strips meeting along an apex edge of the noodle.
Figure 20:
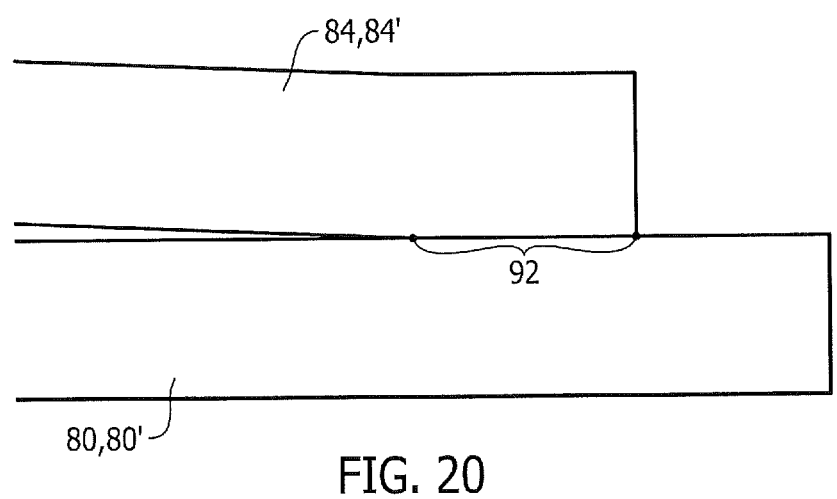
FIG. 20 is a representation of the interaction between a pair of pre-preg fabric strips meeting along an apex edge of the noodle.
Figure 21:
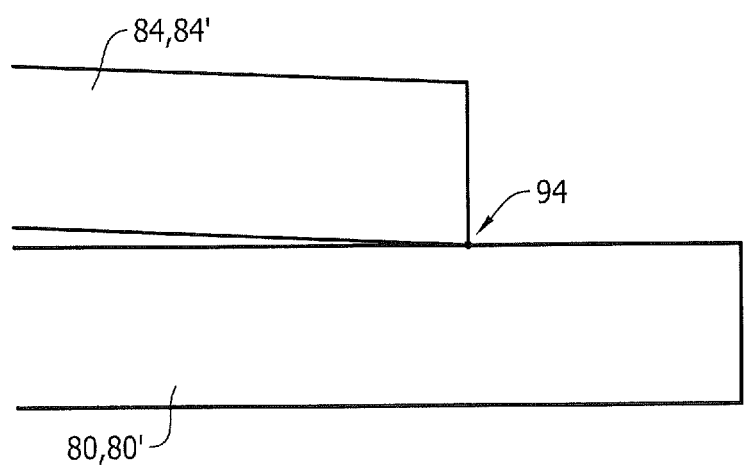
FIG. 21 is a representation of the interaction between a pair of pre-preg fabric strips meeting along an apex edge of the noodle.

A fourth pre-preg fabric strip 72 covers the first strip 64 on the core first surface 56. The fourth strip 72 has a length that extends completely across the length of the first strip 64. In the embodiment shown in FIG. 4, the fourth strip 72 has a width that is larger than the width of the first strip 64. In another embodiment the width of the fourth strip 72' is smaller than the width of the first strip 64'. This embodiment is represented in FIGS. 8 and 9.

A fifth pre-preg fabric strip 74 covers the second strip 66 on the core second surface 58. The fifth strip 74 has a length that extends completely along the length of the second strip 66. In the embodiment shown in FIG. 4, the fifth strip 74 has a width that is larger than the width of the second strip 66. In another embodiment the fifth strip 74' has a width that is smaller than the width of the second strip 66'. This embodiment is represented in FIGS. 8 and 9.

A sixth pre-preg fabric strip 76 covers the third strip 68 on the core third surface 60. The sixth strip 76 has a length that extends completely along the length of the third strip 68. In the embodiment shown in FIG. 4, the sixth strip 76 has a width that is larger than the width of the third strip 68. In another embodiment the sixth strip 76' has a width that is smaller than the width of the third strip 68'. This embodiment is represented in FIGS. 8 and 9.

A seventh pre-preg fabric strip 80 covers the fourth strip 72 and the first strip 64. The seventh strip 80 has a length that extends completely along the length of the fourth strip 72. In the embodiment shown in FIG. 4, the seventh strip 80 has a width that is larger than and extends completely across the fourth strip 72. In another embodiment the seventh strip 80' has a width that is smaller than the width of the fourth strip 72'. This embodiment is represented in FIGS. 8 and 9.

An eighth pre-preg fabric strip 82 covers the fifth strip 74 and the second strip 66. The eighth strip 82 has a length that extends completely along the length of the fifth strip 74. In the embodiment shown in FIG. 4, the eight strip 82 has a width that is larger than and extends completely across the width of the fifth strip 74. In another embodiment the eighth strip 82' has a width that is smaller than the width of the fifth strip 74'. This embodiment is represented in FIGS. 8 and 9.

A ninth pre-preg fabric strip 84 covers the sixth strip 76 and the third strip 68. The ninth strip 84 has a length that extends completely along the length of the sixth strip 76. In the embodiment shown in FIG. 4, the ninth strip 84 has a width that is larger than and extends completely across the width of the sixth strip 76. In another embodiment the ninth strip 84' has a width that is smaller than the width of the sixth strip 76'. This embodiment is represented in FIGS. 8 and 9.

Figure 7:
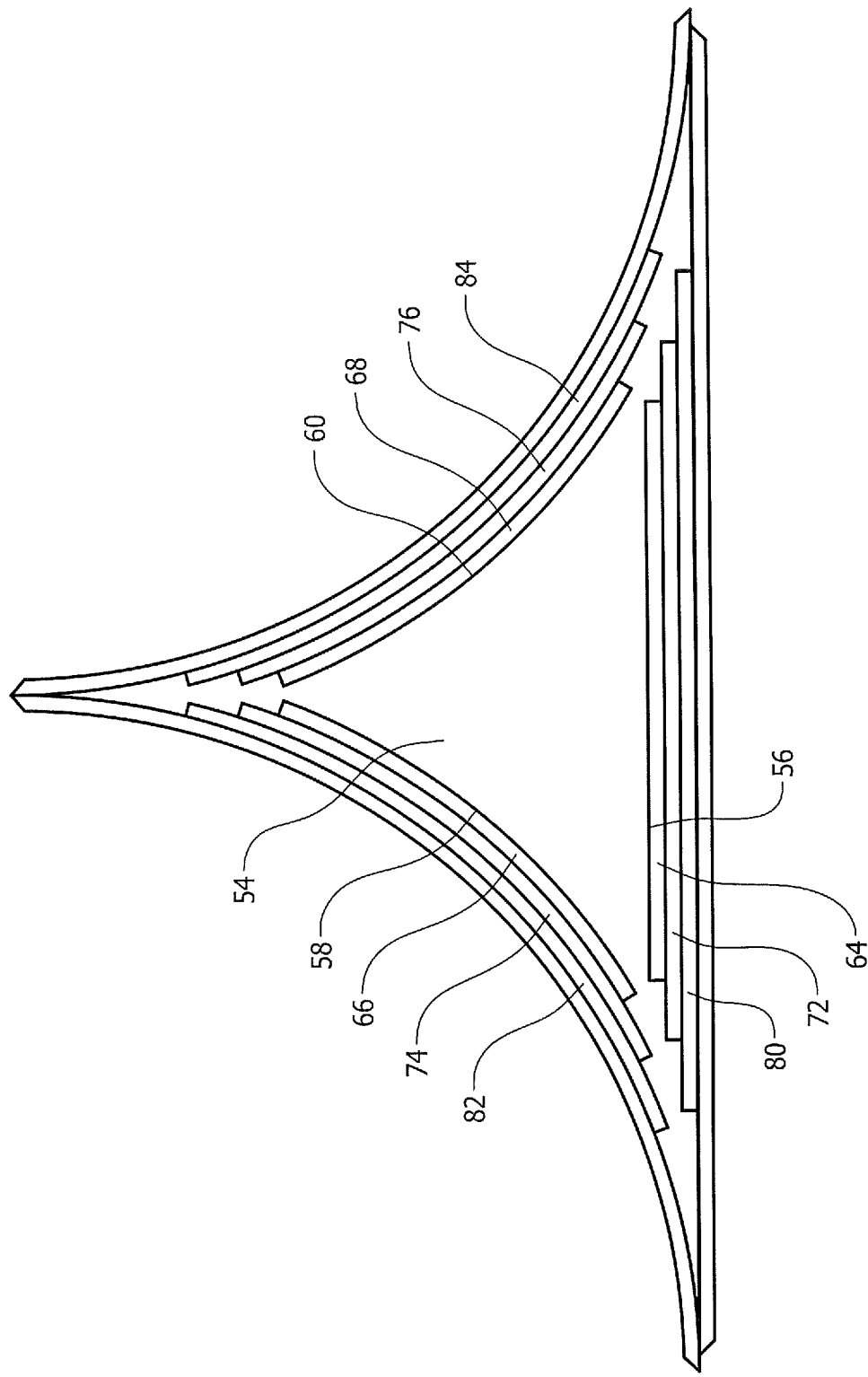
FIG. 7 is a representation of an end elevation view of a variant embodiment of the noodle.

Although the embodiment of the noodle 40 described above and shown in FIG. 4 is constructed with three plies of pre-preg fabric strips on each of the three surfaces of the core 54, the noodle could be constructed with fewer or more plies of fabric. For example, the noodle represented in FIG. 7 is constructed with four plies of pre-preg fabric strips on each of the three surfaces of the noodle core.

Each of the strips of the noodle 40 are cut to size aided by an optical laser template (OLT). The OLT is basically a numerically controlled laser system that is mounted on a gantry above a flat tool surface or above the spar being constructed. The OLT projects the outline of each of the strips onto the tool or part as the strips are cut and then laid down. The strips are laid down onto each projected outline as the strips are stacked. The strip stacks are laid up flat (two, three or four strips high) and installed (either flipped or not flipped) on the c-channel 44, 46 surfaces and the spar top flange 50 surfaces that are adjacent the middle cavity or gap 42. Any overfill of the core 54 is variable based on the width of the unidirectional pre-preg tape used to produce the core. The core 54 can be produced or formed by any method. As stated earlier, pultrusion is the current choice of production based on production rate. The number of strips and the widths of the strips are also variable. This combination allows for more design space than other noodles. For example, results of finite element method (FEM) testing can be used to determine that the core 54 needs to be a certain area to minimize peak stresses. Then the strips can be sized to achieve the proper overfill of the gap 42 and tailor the amount of crack protection (more strips equal more protection) and also the stiffness of the strip laminate (FEM results based on the orientation of the strip laminate can be integrated quickly). Alternatively, it is possible to design two noodles of different sizes that utilize the same core.

Figure 5:
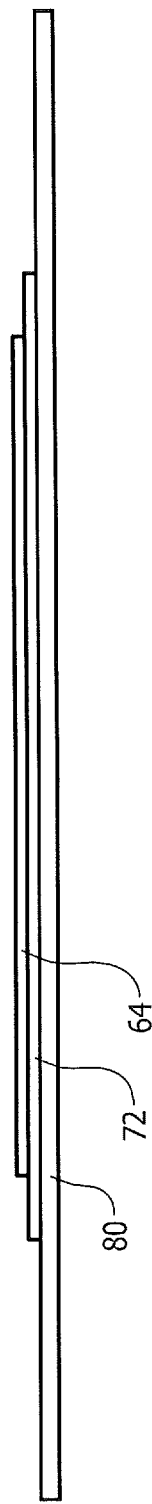
FIG. 5 is a representation of an end elevation view of layers of pre-preg fabric strips employed in practicing the method of constructing the noodle.
Figure 6:
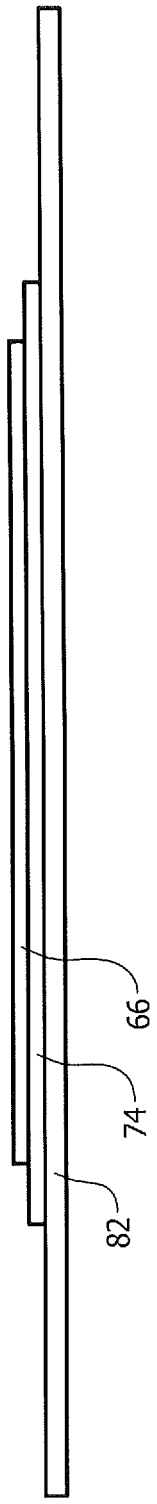
FIG. 6 is a representation of an end elevation view of layers of pre-preg fabric strips employed in the method of constructing the noodle.

FIG. 5 is a representation of the stack of strips 64, 72, 80 that are applied to the core first surface 56. FIG. 6 is a representation of the stack of strips 66, 74, 82 that are applied to the core second surface 58. The stack of strips 68, 76, 84 applied to the core third surface 60 would appear the same as the stack shown in FIG. 6. In constructing the embodiment of the noodle 40 represented in FIG. 4, the strips are first stacked and then flipped over prior to being applied to the respective surfaces 56, 58, 60 of the core 54.

FIG. 8 is a representation of the cut strips being applied to the surfaces of the core where the widest strips in the stacks are applied to the core surfaces. This produces the embodiment of the noodle 40' represented in FIG. 9.

The plys of fabric strips that meet along the distal apex edges of the noodle 40 come together in basically three ways. These are represented in FIGS. 10-21 which show possible interactions between the distal edges of the widest strips of the noodle 40 as they come together at a distal apex edge of the noodle. FIGS. 10-21 represent examples of the interactions of the edge of the seventh strip 80, 80' or the base strip of the noodle with the ninth strip 84, 84' or the right side strip of the noodle as shown in FIGS. 4, 7 and 9. It should be understood that the interactions of the seventh strip 80, 80' or the base strip of the noodle 40 and the eighth strip 82, 82' at the left distal end apex of the noodle as shown in FIGS. 4, 7 and 9 would be a mirror image of the interactions shown in FIGS. 10-21.

As represented in FIGS. 10-13, the end edge of the widest side strip or ninth strip 84, 84' interacts with the end edge of the widest base strip or seventh strip 80, 80' at a same terminal point 90.

Alternatively, the end edge of the widest side strip or ninth strip 84, 84' extends slightly beyond the end edge of the widest base strip or seventh strip 80, 80' as represented in FIGS. 14-17.

Still further, the end edge of the widest base strip or seventh strip 80, 80' extends slightly beyond the end edge of the widest side strip or ninth strip 84, 84' as represented in FIGS. 18-21.

For each of the interactions between the end edge of the widest side strip or ninth strip 84, 84' and the end edge of the widest base strip or seventh strip 80, 80', the strip end edges can be cut at any angle such that the strip end edges end in a beveled edge as represented in FIGS. 10, 11, 14, 15, 18 and 19, or squared edges as represented in FIGS. 12, 13, 16, 17, 20 and 21.

Furthermore, the end edge of the widest side strip or ninth strip 84, 84' can meet with the end edge of the widest base strip or seventh strip 80, 80' along a small area of co-tangency 92 as represented in FIGS. 10, 12, 14, 16, 18 and 20, or the end edges may meet at only a single point 94 as represented in FIGS. 11, 13, 15, 17, 19 and 21.

In the construction of the noodle described above, the multiple plys of fabric strips on the exterior surface of the noodle core enable the noodle core to be reduced in size, thereby likely reducing the chance of thermally induced matrix cracks forming in the core. The fabric jacket produced by the multiple plys of fabric strips on the exterior surfaces of the core provide a higher fracture toughness material to the core exterior and an arduous crack path to the noodle exterior for the purpose of preventing cracks from propagating out of the noodle core. All of this is accomplished without affecting the configuration of the noodle exterior. The noodle unidirectional core can be produced at a high rate with existing pultrusion machines, and the fabric strips on the core exterior surfaces can be installed on the spar or stringer charges at the same time the unidirectional core is installed. The number, thickness and fiber orientation of the fabric strips can be adjusted to achieve a desired level of mechanical strength. For example, the plurality of first strips could have fibers oriented in different directions and different thicknesses. Additionally, the plurality of second strips could also have fibers oriented in different directions, etc. Changing the number of fabric strips on the exterior surfaces of the core also enables adjusting the size of the core, which is desirable for achieving an ideally smaller core for the sake of preventing cracks, while maintaining a large enough core to be produced at high rates by pultrusion. The multiple plies of fabric strips can be assembled on the exterior surfaces of the core, or could be assembled on a flat tool in a flat configuration of the strips prior to their being assembled to a surface of the core.

As various modifications could be made in the construction of the apparatus and its method of construction herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A composite, radius filler noodle comprising:
    a core having a triangular cross-section configuration and first, second and third surfaces that extend along a length of the core, the core being constructed of unidirectional pre-preg tape that extends along the core length, the core unidirectional pre-preg tape having been pultruded into the triangular cross-section of the core;
    a plurality of pre-preg fabric first strips stacked on the core first surface, the plurality of first strips having lengths that extend completely along the core length, the plurality of first strips have width dimensions that extend completely across the first surface of the core, the plurality of first strips width dimensions increase as the stack of the plurality of first strips extends away from the first surface of the core to an outermost first strip at an exterior of the composite, radius filler noodle;
    a plurality of pre-preg fabric second strips stacked on the core second surface, the plurality of second strips having lengths that extend completely along the core length, the plurality of second strips have width dimensions that extend completely across the second surface of the core, the plurality of second strips width dimensions increase as the stack of the plurality of second strips extends away from the second surface of the core to an outermost second strip at the exterior of the composite, radius filler noodle; and,
    a plurality of pre-preg fabric third strips stacked on the core third surface, the plurality of third strips having lengths that extend completely along the core length, the plurality of third strips have width dimensions that extend completely across the third surface of the core, the plurality of third strips width dimensions increase as the stack of the plurality of third strips extends away from the third surface of the core to an outermost third strip at the exterior of the composite, radius filler noodle.

2. The composite, radius filler noodle of claim 1, further comprising:
the plurality of first strips being different in number from the plurality of second strips.

3. The composite, radius filler noodle of claim 1, further comprising:
the plurality of first strips having fibers oriented in different directions.

4. The composite, radius filler noodle of claim 3, further comprising:
the plurality of second strips having fibers oriented in different directions.

5. The composite, radius filler noodle of claim 1, further comprising:
the plurality of first strips having different thicknesses.

6. The composite, radius filler noodle of claim 1, further comprising:
the plurality of first strips having increasing widths in the stack of first strips.

7. The composite, radius filler noodle of claim 1, further comprising:
the plurality of first strips having decreasing widths in the stack of first strips.

8. The composite, radius filler noodle of claim 1, further comprising:
a first composite channel;
a second composite channel;
the first composite channel and the second composite channel being brought together forming a central web of a spar and a flange of the spar;
a v-shaped gap in the flange of the spar; and,
the composite, radius filler noodle being positioned in the v-shaped gap with the plurality of second strips opposing the first composite channel, the plurality of third strips opposing the second composite channel, and the plurality of first strips extending across the top of the v-shaped gap.

9. A composite, radius filler noodle comprising:
a core having a triangular cross-section configuration and first, second and third surfaces that extend along a length of the core, the core being constructed of unidirectional pre-preg tape that extends along the core length, the unidirectional pre-preg tape having been pultruded into the triangular cross-section of the core;
a pre-preg fabric first strip on the core first surface, the first strip having a length that extends completely along the core length and a width that extends completely across the core first surface;
a pre-preg fabric second strip on the core second surface, the second strip having a length that extends completely along the core length and a width that extends completely across the core second surface;
a pre-preg fabric third strip on the core third surface, the third strip having a length that extends completely along the core length and a width that extends completely across the core third surface; and,
the width of the pre-preg fabric second strip and the width of the pre-preg fabric third strip being the same and being smaller than the width of the pre-preg fabric first strip.

10. The composite, radius filler noodle of claim 9, further comprising:
a pre-preg fabric fourth strip on the first strip, the fourth strip having a length that extends completely along the first strip length and a width that extends completely across the first strip;
a pre-preg fabric fifth strip on the second strip, the fifth strip having a length that extends completely along the second strip length and a width that extends completely across the second strip; and,
a pre-preg fabric sixth strip on the third strip, the sixth strip having a length that extends completely along the third strip length and a width that extends completely across the third strip.

11. The composite, radius filler noodle of claim 9, further comprising:
a pre-preg fabric fourth strip on the first strip, the fourth strip having a length that extends completely along the first strip length and a width that is smaller than the first strip width;
a pre-preg fabric fifth strip on the second strip, the fifth strip having a length that extends completely along the second strip length and a width that is smaller than the second strip width; and,
a pre-preg fabric sixth strip on the third strip, the sixth strip having a length that extends completely along the third strip length and a width that is smaller than the third strip width.

12. The composite, radius filler noodle of claim 10, further comprising:
a pre-preg fabric seventh strip on the fourth strip, the seventh strip having a length that extends completely along the fourth strip length and a width that extends completely across the fourth strip width;
a pre-preg fabric eighth strip on the fifth strip, the eighth strip having a length that extends completely along the fifth strip length and a width that extends completely across the fifth strip width; and,
a pre-preg fabric ninth strip on the sixth strip, the ninth strip having a length that extends completely along the sixth strip length and a width that extends completely across the sixth strip width.

13. The composite, radius filler noodle of claim 11, further comprising:
a pre-preg fabric seventh strip on the fourth strip, the seventh strip having a length that extends completely along the fourth strip length and a width that is smaller than the fourth strip width;
a pre-preg fabric eighth strip on the fifth strip, the eighth strip having a length that extends completely along the fifth strip length and a width that is smaller than the fifth strip width; and,
a pre-preg fabric ninth strip on the sixth strip, the ninth strip having a length that extends completely along the sixth strip length and a width that is smaller than the sixth strip width.

14. The composite, radius filler noodle of claim 10, further comprising:
the fourth and first strips having fibers oriented in different directions;
the fifth and second strips having fibers oriented in different directions; and,
the sixth and third strips having fibers oriented in different directions.

15. The composite, radius filler noodle of claim 11, further comprising:

the fourth and first strips having fibers oriented in different directions;

the fifth and second strips having fibers oriented in different directions; and, the sixth and third strips having fibers oriented in different directions.

16. The composite, radius filler noodle of claim 10, further comprising:

the fourth and first strips having different thicknesses;

the fifth and second strips having different thicknesses; and, the sixth and third strips having different thicknesses.

17. The composite, radius filler noodle of claim 11, further comprising:

the fourth and first strips having thicknesses that are different;

the fifth and second strips having thicknesses that are different; and, the sixth and third strips having thicknesses that are different.

18. The composite, radius filler noodle of claim 9, further comprising:

a first composite channel;

a second composite channel;

the first composite channel and the second composite channel being brought together forming a central web of a spar and a flange of the spar;

a v-shaped gap in the flange of the spar; and, the composite, radius filler noodle being positioned in the v-shaped gap with the plurality of second strips opposing the first composite channel, the plurality of third strips opposing the second composite channel, and the plurality of first strips extending across the top of the v-shaped gap.

19. The composite, radius filler noodle of claim 9, further comprising:

a plurality of pre-preg fabric strips stacked on the first strip;

a plurality of pre-preg fabric strips stacked on the second strip; and, a plurality of pre-preg fabric strips stacked on the third strip.

20. The composite, radius filler noodle of claim 19, further comprising:

the plurality of pre-preg fabric strips stacked on the first strip having width dimensions that extend completely across the first strip, the width dimensions increasing as the plurality of pre-preg fabric strips stacked on the first strip extend away from the first strip;

the plurality of pre-preg fabric strips stacked on the second strip having width dimensions that extend completely across the second strip, the width dimensions increasing as the plurality of pre-preg fabric strips stacked on the second strip extend away from the second strip; and, the plurality of pre-preg fabric strips stacked on the third strip having width dimensions that extend completely across the third strip, the width dimensions increasing as the plurality of pre-preg fabric strips stacked on the third strip extend away from the third strip.

* * * * *